United States Patent
Ono et al.

(10) Patent No.: US 9,914,341 B2
(45) Date of Patent: Mar. 13, 2018

(54) FRAGRANCE DEVICE FOR VEHICLE AND FRAGRANCE BLOWING METHOD

(75) Inventors: Kenji Ono, Yokohama (JP); Yuzuru Yoshinami, Zama (JP); Ryunosuke Ino, Yokohama (JP); Kenichiro Minami, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 13/381,740

(22) PCT Filed: Jun. 10, 2010

(86) PCT No.: PCT/JP2010/059833
§ 371 (c)(1),
(2), (4) Date: Dec. 30, 2011

(87) PCT Pub. No.: WO2011/001808
PCT Pub. Date: Jan. 6, 2011

(65) Prior Publication Data
US 2012/0107172 A1    May 3, 2012

(30) Foreign Application Priority Data
Jul. 1, 2009  (JP) ................. 2009-156629

(51) Int. Cl.
*B60H 3/00*    (2006.01)
(52) U.S. Cl.
CPC ... *B60H 3/0035* (2013.01); *B60H 2003/0042* (2013.01)
(58) Field of Classification Search
CPC .................................... B60H 3/0035
See application file for complete search history.

(56) References Cited

U.S. PATENT DOCUMENTS

| 5,429,180 A | 7/1995 | Nishino et al. |
| 5,591,409 A * | 1/1997 | Watkins ............... 422/110 |

(Continued)

FOREIGN PATENT DOCUMENTS

| CN | 2158360 Y | 3/1994 |
| CN | 2343019 Y | 10/1999 |

(Continued)

OTHER PUBLICATIONS

English machine translation of JP 2002-283844 Taguchi et al. (Mar. 2002). Retrieved from International Property Digital Library.*

(Continued)

*Primary Examiner* — Donald R Spamer
(74) *Attorney, Agent, or Firm* — Foley & Lardner LLP

(57) ABSTRACT

Provided is a fragrance device for vehicle with an aim to restrain an olfactory adaptation of an occupant, to continuously provide the occupant for a long time with changes in sensory intensity of smell caused by intermittent smell emission, and to provide the occupant for a long time with a relaxation effect due to a smell, the fragrance device for vehicle includes: a fragrance holder holding a fragrance; a blowing means for blowing air to the fragrance holder to blow a smell of the fragrance into a vehicle cabin; and a fragrance blowing control means for sequentially repeating the repeating of a predetermined cycle of blowing a smell of the fragrance and a pause predetermined times by intermittently blowing the smell at each cycle, and then the providing of a stop time for stopping the blowing out of the smell of the fragrance for a predetermined time period.

8 Claims, 10 Drawing Sheets

(56) References Cited

U.S. PATENT DOCUMENTS

| | | | | |
|---|---|---|---|---|
| 5,958,346 A * | 9/1999 | Evans, Jr. | .................... | 422/120 |
| 5,958,364 A * | 9/1999 | Dunne et al. | ................. | 423/652 |
| 2005/0271371 A1 * | 12/2005 | Wefler | ..................... | A61L 9/12 |
| | | | | 392/492 |

FOREIGN PATENT DOCUMENTS

| | | | | | |
|---|---|---|---|---|---|
| EP | 2 145 788 A1 | | 1/2010 | | |
| JP | 02-060821 A | | 3/1990 | | |
| JP | 05-007242 U | | 2/1993 | | |
| JP | 06-270664 A | | 9/1994 | | |
| JP | 07184986 | * | 7/1995 | | |
| JP | 2002-283844 | * | 3/2002 | .............. | B60H 3/00 |

OTHER PUBLICATIONS

Kawakatsu. JP 07184986. Jul. 1995. English Machine Translation.*

* cited by examiner

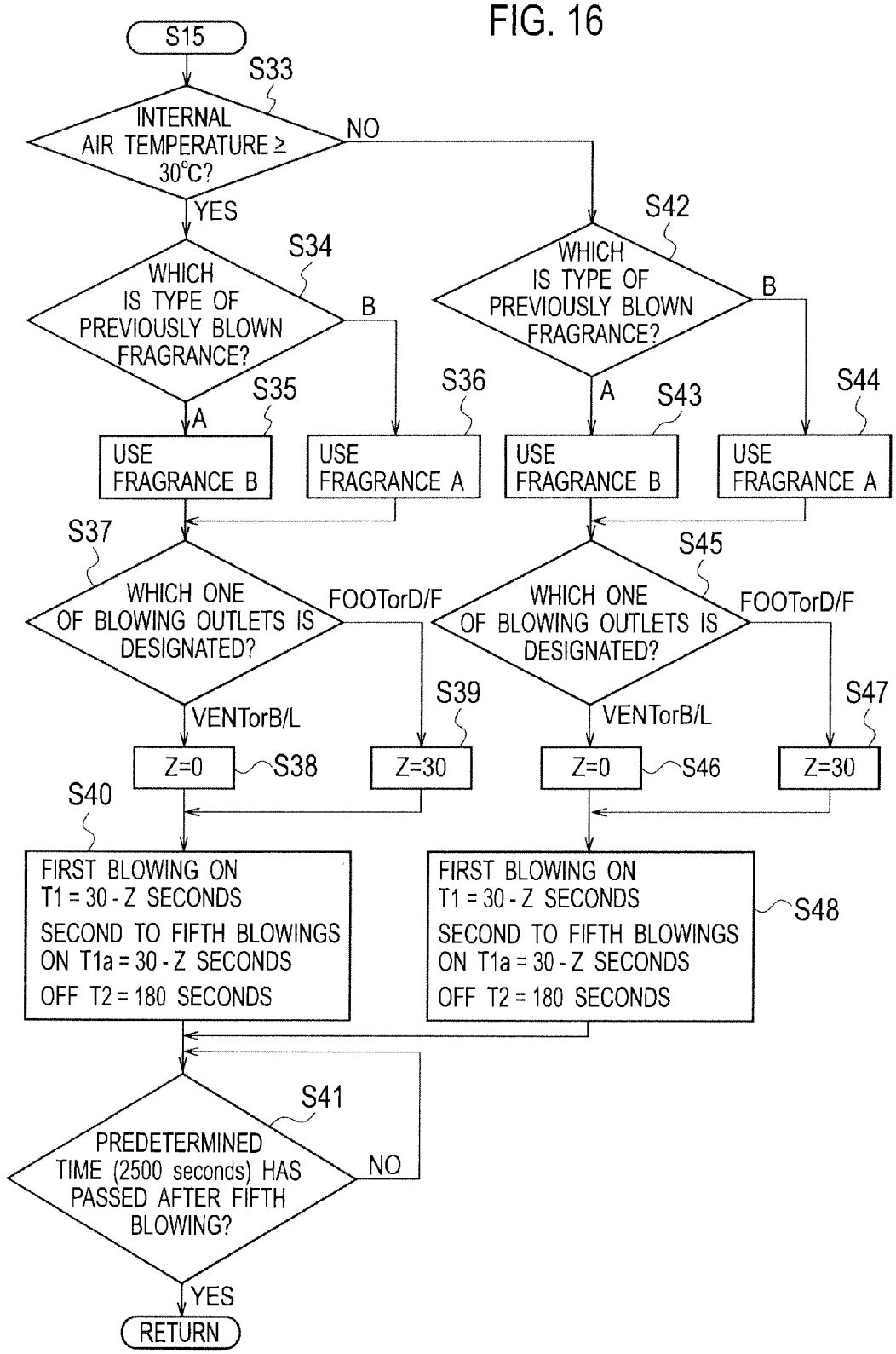

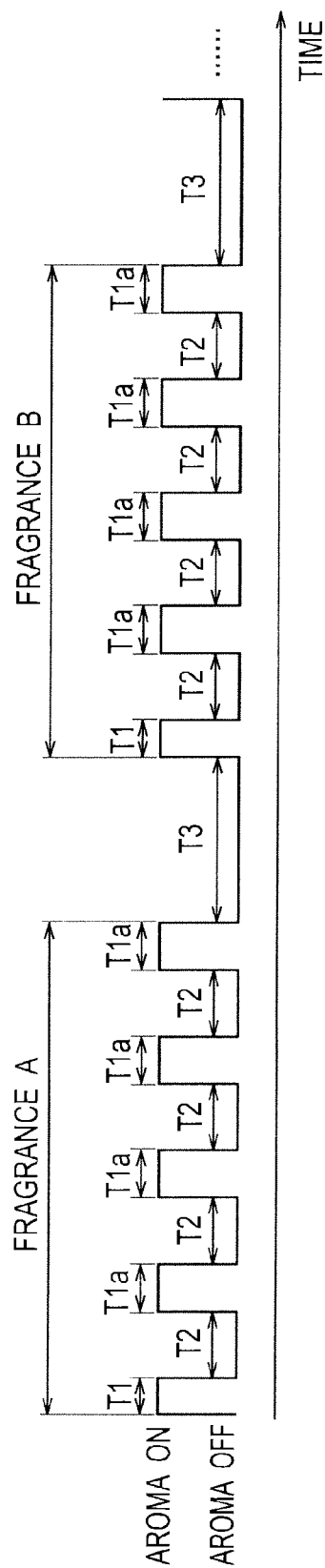

FRAGRANCE DEVICE FOR VEHICLE AND FRAGRANCE BLOWING METHOD

TECHNICAL FIELD

The present invention relates to a fragrance device for vehicle.

BACKGROUND ART

Japanese Patent Application Publication No. H02 (1990)-60821 discloses a fragrance device for vehicle configured to retard adaptation of smell sensitivity of an occupant by intermittently emitting a smell by opening and closing an opening and closing valve of a fragrance container holding a fragrance.

SUMMARY OF INVENTION

Technical Problem

The aforementioned fragrance device for vehicle, however, has an emitted smell of a relatively high concentration and a short pause time in the intermittent emission with respect to a ventilation amount in a vehicle cabin. Thus, as time passes, the vehicle cabin becomes full of the smell. As a result, an effect of the intermittent emission cannot be obtained, and the olfactory adaptation of the occupant takes place early. Thus, the fragrance device for vehicle is not suitable for making the occupant feel relaxed or easy for a long time.

In other words, even if the fragrance device for vehicle can temporarily retard the olfactory adaptation of the occupant by means of the intermittent emission of the smell, the olfactory adaptation of the occupant takes place after the elapse of a certain time for the above reasons, and the intensity of sensation to the smell is reduced. Thus, a relaxation effect due to a smell cannot be continuously provided to the occupant for a long time.

The present invention has been made in view of the problem. An object thereof is to restrain an olfactory adaptation of an occupant, to continuously provide the occupant for a long time with changes in sensory intensity of smell caused by intermittent smell emission, and to provide a fragrance device for vehicle and a fragrance blowing method capable of continuously providing the occupant for a long time with a relaxation effect due to a smell.

Solution to Problem

A first aspect of the present invention is a fragrance device for vehicle including: a fragrance holder holding a fragrance; a blowing means for blowing air to the fragrance holder to blow a smell of the fragrance into a vehicle cabin; and a fragrance blowing control means for sequentially repeating the repeating of a predetermined cycle of blowing a smell of the fragrance and a pause predetermined times by intermittently blowing the smell at each cycle, and then the providing of a stop time for stopping the blowing out of the smell of the fragrance for a predetermined time period.

In addition, a second aspect of the present invention is a method for blowing a fragrance for vehicle including: sequentially repeating an intermittent blowing cycle and a stop time, the intermittent blowing cycle including repeating a predetermined cycle of blowing of a smell of a fragrance and a pause predetermined times to intermittently blow the smell of the fragrance into a vehicle cabin, the stop time being for stopping the blowing of the smell of the fragrance for a predetermined time period from the end of the intermittent blowing cycle to the start of the next intermittent blowing cycle.

BRIEF DESCRIPTION OF DRAWINGS

FIG. 16 is a flowchart showing processing in Step S15 in the control flowchart in FIG. 14.

FIG. 17 is a diagram for explaining intermittent blowing of fragrance in the fifth embodiment.

DESCRIPTION OF EMBODIMENTS

Hereinbelow, specific embodiments to which the present invention is applied are described in detail with reference to the drawings.

First Embodiment

Figure 1:
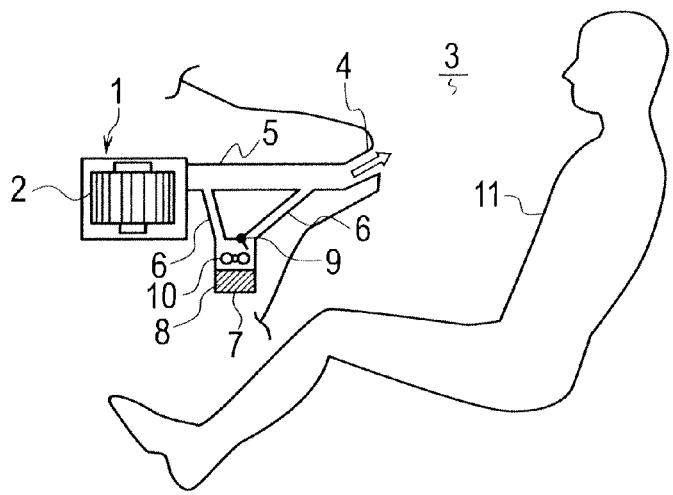
FIG. 1 shows a configuration of a fragrance device for vehicle according to a first embodiment of the present invention.

Firstly, a description is given of a basic configuration of a fragrance device for vehicle to which the present invention is applied. As shown in FIG. 1, the fragrance device for vehicle includes an air conditioner fan 2 of an air conditioner for vehicle 1, a main air duct 5 extending from the air-conditioner fan 2 to an air conditioner outlet 4 opening in a vehicle cabin 3, a branched air duct 6 branched from the middle of the main air duct 5 and again meeting the main air duct 5, and a fragrance holder 8 which is provided on the middle of the branched air duct 6 and holds a fragrance 7.

A fragrance valve 9 for blowing a smell of the fragrance 7 into the vehicle cabin 3 through the air conditioner outlet 4 is provided downstream of the fragrance holder 8. By opening or closing the fragrance valve 9, control is performed in which a smell of the fragrance 7 is blown into the vehicle cabin 3 or the smell is stopped from being blown. A fragrance fan 10 is provided upstream or downstream of the fragrance 7. The control for blowing or stopping blowing the smell of the fragrance 7 may be performed by operating or stopping the fragrance fan 10. Note that in the following embodiments, the control for blowing or stopping blowing the smell of the fragrance 7 is performed by opening or closing the fragrance valve 9, instead of operating the fragrance fan 10.

Figure 2:
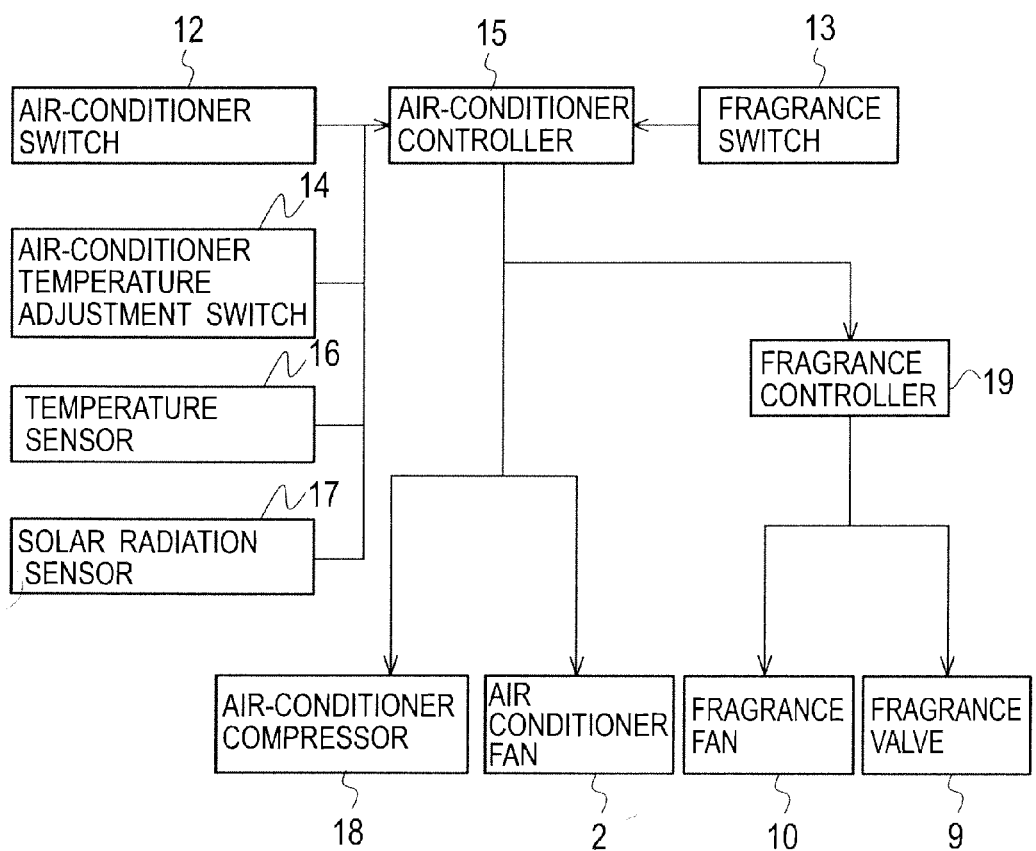
FIG. 2 is a block diagram of the fragrance device for vehicle according to the first embodiment of the present invention.

FIG. 2 is a block diagram of the fragrance device for vehicle according to this embodiment. When an occupant 11 operates an air-conditioner switch 12, a fragrance switch 13, and an air-conditioner temperature adjustment switch 14, signals thereof are transmitted to an air-conditioner controller 15, and the air-conditioner controller 15 controls an air-conditioner compressor 18 and the air-conditioner fan 2 based on information from a temperature sensor 16 and a solar radiation sensor 17. When the fragrance switch 13 is on, a fragrance controller 19 closes and opens the fragrance valve 9, or operates and stops the fragrance fan 10.

In this embodiment, any one of the air-conditioner fan 2 and the fragrance fan 10, or both the air-conditioner fan 2 and the fragrance fan 10 constitute a blowing means for blowing air into the fragrance holder 8 to blow the smell of the fragrance 7 into the vehicle cabin 3. The fragrance controller 19 which controls fragrance valve 9 and the fragrance fan 10 constitutes a fragrance blowing control means.

Figure 3:
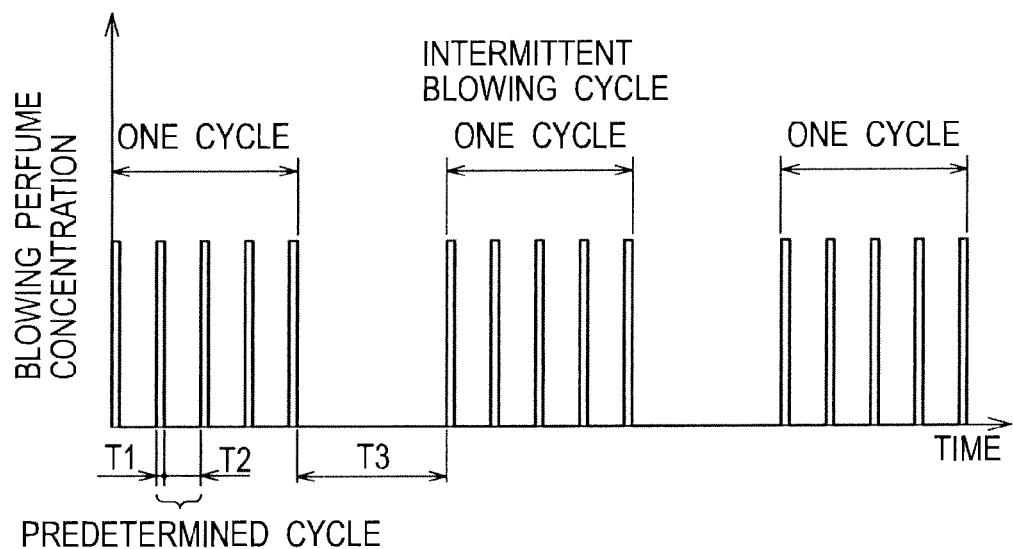
FIG. 3 shows a blowing pattern of a fragrance in the first embodiment.

FIG. 3 shows a blowing pattern of a fragrance in the first embodiment. The fragrance controller 19 controls opening and closing of the fragrance valve 9 so that an intermittent blowing cycle and a stop time are repeated sequentially. In the intermittent blowing cycle, a smell of the fragrance is intermittently blown predetermined times. In the stop time, the blowing of the smell of the fragrance is stopped for a predetermined time period from the end of the intermittent blowing cycle to the start of the next intermittent blowing cycle. In the intermittent blowing cycle, the opening and closing of the fragrance valve 9 are controlled in such a manner that the smell blowing is paused from blowing to the next blowing while a predetermined cycle of the smell blowing is repeated predetermined times. In the predetermined cycle in this embodiment, a blowing time for the smell blowing is set as T1, and a pause time for pausing the smell blowing is set as T2. The intermittent blowing cycle is set in such a manner that the smell blowing is repeated five times (an operation from the start of the first blowing to the end of the fifth blowing set as one cycle of the intermittent blowing cycle). In addition, a stop time from the end of the intermittent blowing cycle to the start of the next intermittent blowing cycle is set as T3 which is longer than the pause time T2.

In this embodiment, the perfume concentration of the fragrance 7 or the perfume concentration of blown air which is blown from the air-conditioner blowing outlet 4 into the vehicle cabin 3 is low, and the stop time T3 for stopping the smell blowing is provided between the intermittent blowing cycles. Thus, even if ventilation mode of an air conditioner is set to internal circulation mode (mode in which outside air is prevented from entering the vehicle cabin 3) and if a ventilation amount in the vehicle cabin 3 is set to be relatively low, an average smell concentration in the vehicle cabin 3 repeats rising and falling while being restrained to be below a certain level, as indicated by a solid line in FIG. 4. In contrast, in a case (hereinafter, referred to as Comparative Example) where the smell of the fragrance 7 is blown intermittently into the vehicle cabin 3 without providing the stop time T3, an average smell concentration in the vehicle cabin gradually rises with the elapse of time, as indicated by a dotted line in FIG. 4. To put it differently, since the stop time T3 is provided in this embodiment, the average smell concentration in the vehicle cabin decreases during the stop time T3 to the concentration approximately at the start of the intermittent blowing cycle. However, in Comparative Example, the vehicle cabin 3 becomes full of the smell with the elapse of time, and the average smell concentration in the vehicle cabin rises without restoring to the initial concentration. Thus, an influence of the intermittent smell blowing on the average smell concentration in the vehicle cabin (a ratio of a fluctuation range of the average smell concentration to the average smell concentration) also gradually decreases.

In addition, in this embodiment, when the ventilation mode of the air conditioner is set to an outside air intake mode in which outside air is introduced into the vehicle cabin 3, the stop time T3 is made shorter than in the internal circulation mode. Since the ventilation amount in the vehicle cabin is larger in the outside air intake mode than in the internal circulation mode, the average smell concentration in the vehicle cabin is restored, at an earlier stage after stopping the smell blowing, to the concentration at the start of the intermittent blowing cycle. However, the stop time T3 is made shorter to resume the intermittent blowing cycle earlier, and thereby the smell of the fragrance 7 can be provided to the occupant 11 effectively according to a ventilation environment in the vehicle cabin 3.

Figure 4:
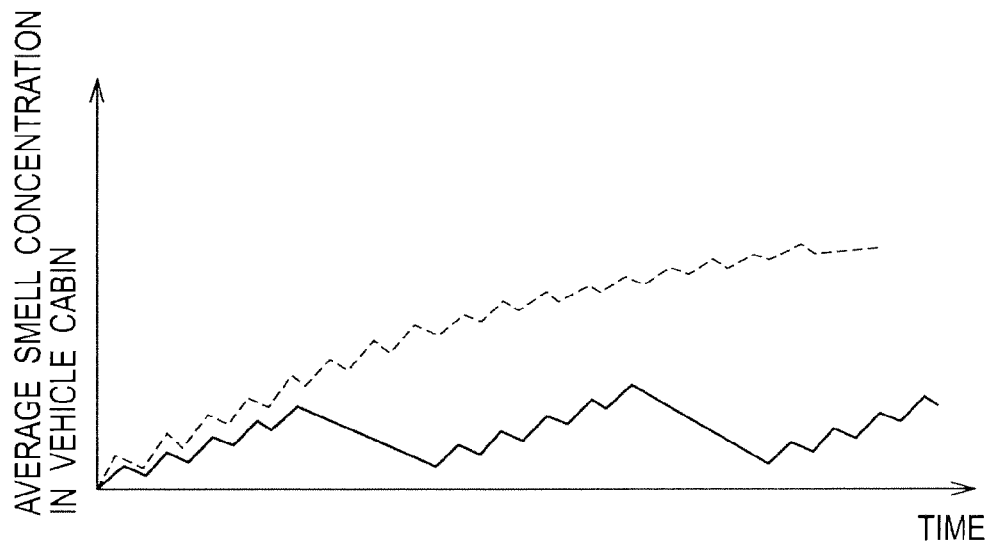
FIG. 4 shows changes in an average smell concentration in a vehicle cabin with respect to time in the first embodiment.
Figure 5:
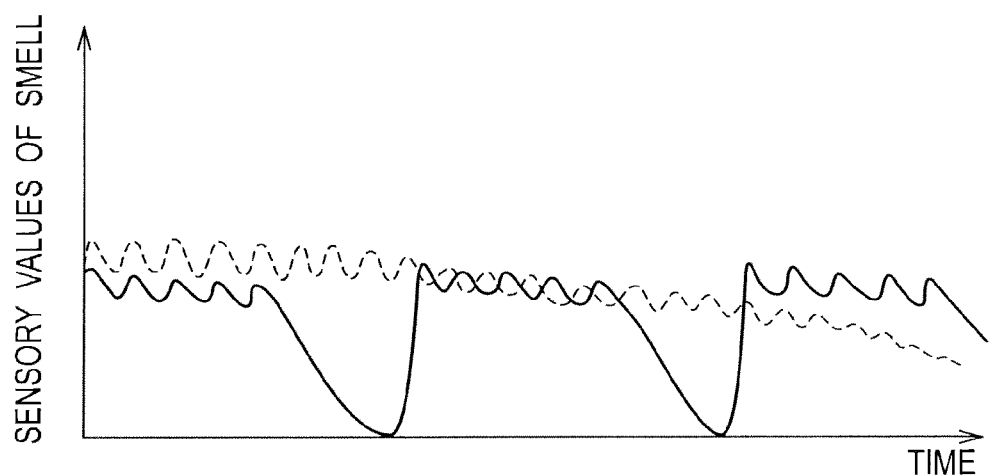
FIG. 5 shows changes in smell sensory values with respect to time in the first embodiment.

FIG. 5 shows changes in sensory values of smell (intensity of sensation to a smell) sensed by the occupant 11 in the vehicle cabin 3 where the average smell concentration changes as shown in FIG. 4. A solid line in FIG. 5 shows changes in the smell sensory value in this embodiment, and a dotted line shows changes in the smell sensory value in Comparative Example. The sensory values of smell sensed by the occupant 11 are expressed by using ranks 0 to 5. Specifically, no smell is ranked as 0; a smell (sensing threshold concentration) just enough to be sensed (even though what smells cannot be identified), 1; a weak smell (recognition threshold concentration) but enough to identify what smells, 2; a concentration sensed readily, 3; a strong smell, 4; and a sharp smell, 5. In this embodiment, the fragrance controller 19 controls the fragrance valve 9 and the fragrance fan 10 to set the recognition threshold concentration. Based on the recognition threshold concentration, the smell is recognized as being weak but enough for the occupant 11 to know what the smell is of when the smell is blown.

In this embodiment, the maximum value of the smell sensory value is 2, that is, the smell is weak but enough for the occupant 11 to know what the smell is of. The fluctuation range of the smell sensory value in one intermittent blowing cycle is smaller than in Comparative Example. This is because the perfume concentration of the fragrance or the perfume concentration of the blown air is lower in this embodiment than that in Comparative Example. In this embodiment, however, intermittently blowing the smell restrains olfactory adaptation of the occupant 11 which would occur in continuously blowing the smell.

Figure 6:
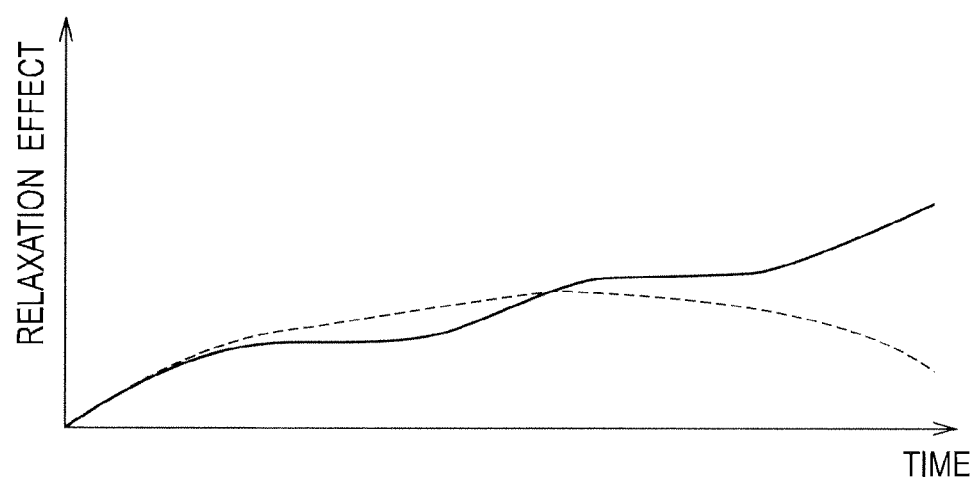
FIG. 6 shows changes in a relaxation effect with respect to time in the first embodiment.

Further, in this embodiment, the smell sensory value exhibits the changes repeated in the same pattern without attenuating even after a long time passes, as shown by the solid line in FIG. 5. As a result, when a fragrance having a relaxation effect is used, the relaxation effect can be raised continuously for a long time, as shown by a solid line in FIG. 6. In contrast, in Comparative Example, since the vehicle cabin is filled with the smell with the elapse of time, the olfaction of the occupant adapts to the smell. This lowers the smell sensory value and also decreases the relaxation effect with the elapse of time, as shown by a dashed line in FIG. 6. In this embodiment, although the relaxation effect once rises sluggishly during the stop time T3, the next intermittent blowing cycle is started before the start of decrease of the relaxation effect, and the smell of the fragrance 7 is blown into the vehicle cabin 3. Thus, the relaxation effect can be provided continuously over time.

Figure 7:
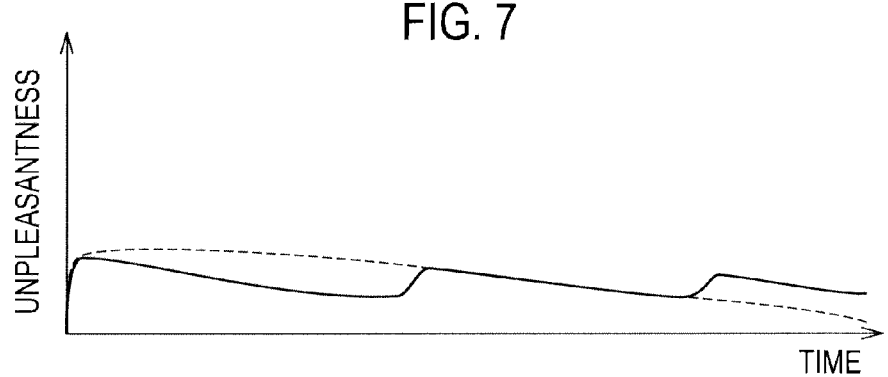
FIG. 7 shows changes in unpleasantness with respect to time in the first embodiment.

In addition, in this embodiment, since the fragrance 7 or the blown air has the low perfume concentration, the degree of smell pleasantness-unpleasantness is not easily influenced by smell preferences of the occupant 11. For example, even though the occupant dislikes the fragrance 7, the degree of unpleasantness is not high. In this embodiment, the degree of unpleasantness slightly rises immediately after the start of the intermittent blowing cycle as shown by a solid line in FIG. 7, but later remains at a low level on average. In contrast, in Comparative Example, the degree of unpleasantness is high at an early stage after the start of blowing, as shown by a dashed line in FIG. 7.

Figure 8:
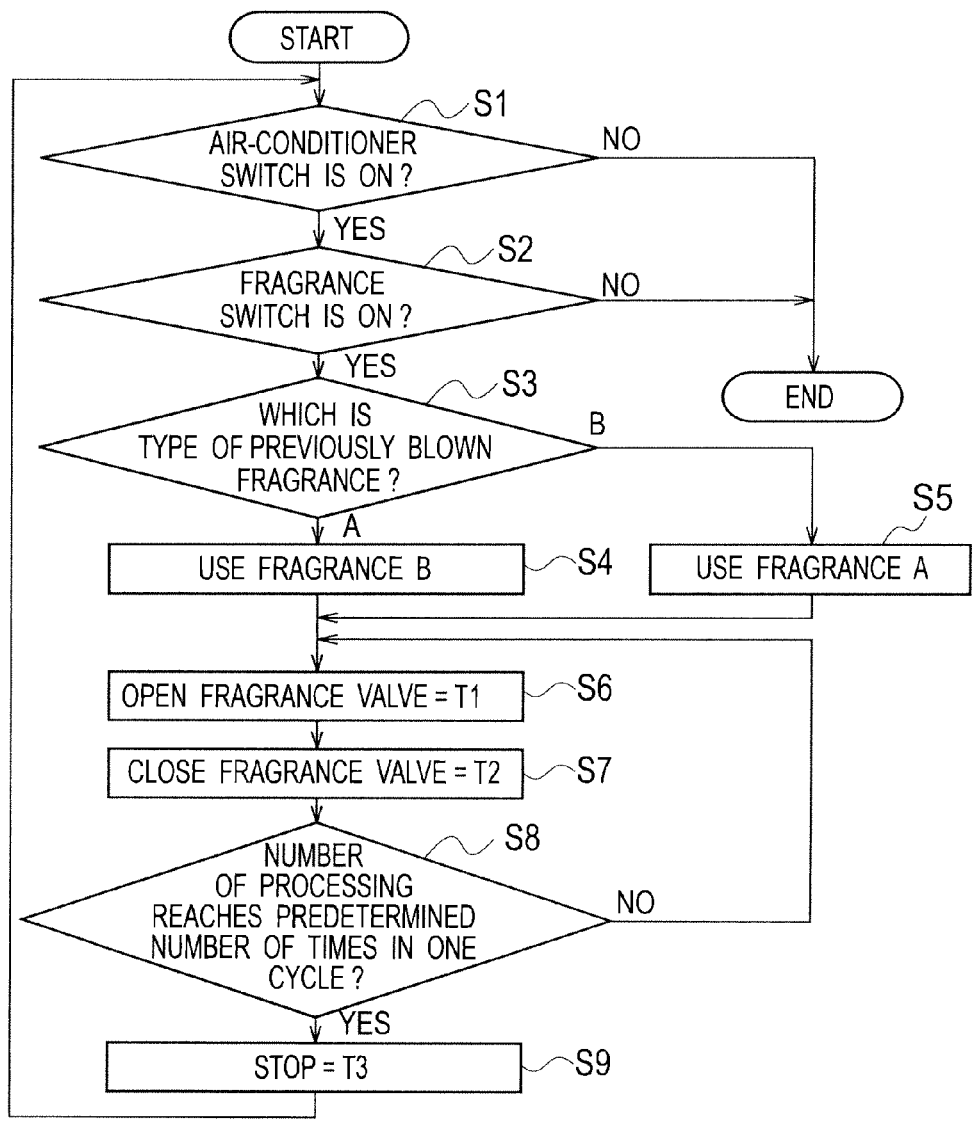
FIG. 8 is a flowchart for fragrance blowing control by a fragrance blowing method in the first embodiment.

FIG. 8 shows a control flowchart in a case of using the fragrances 7 having two types A and B. In the control flowchart, firstly in processing in Step S1, whether or not the air-conditioner switch 12 is ON is detected. If the air-conditioner switch 12 is OFF, the control flow ends. If the air conditioner itself is not operated, the smell of the fragrance 7 is not blown, and thus the life of the fragrance 7 can be secured.

If the air-conditioner switch 12 is ON, whether or not the fragrance switch 13 is ON is detected in processing in next Step S2. If the fragrance switch 13 is OFF, the control flow ends. When the occupant 11 does not need air-conditioning air containing the smell of the fragrance 7, the smell of the fragrance 7 is not blown to secure the life of the fragrance 7. If the fragrance switch 13 is ON, it is determined in processing in next Step S3 which one, A or B, the type of the previously blown fragrance 7 is. If the type of the previously blown fragrance 7 is A, a fragrance B is used in processing in Step S4. If the type of the previously blown fragrance 7 is B, a fragrance A is used in processing in Step S5.

For example, leaf alcohol can be used as the fragrance A, and borneol can be used as the fragrance B. In addition, one of the fragrance A and the fragrance B of different types is blown in one cycle alternately. The order of blowing may be the blowing of the fragrance A and then the fragrance B, or the blowing of the fragrance B and then the fragrance A. Use of the fragrance A and the fragrance B of the two types enables the occupant 11 to enjoy different smells, while restraining olfactory adaptation. Thus, a further relaxation effect can be obtained.

Figure 9:
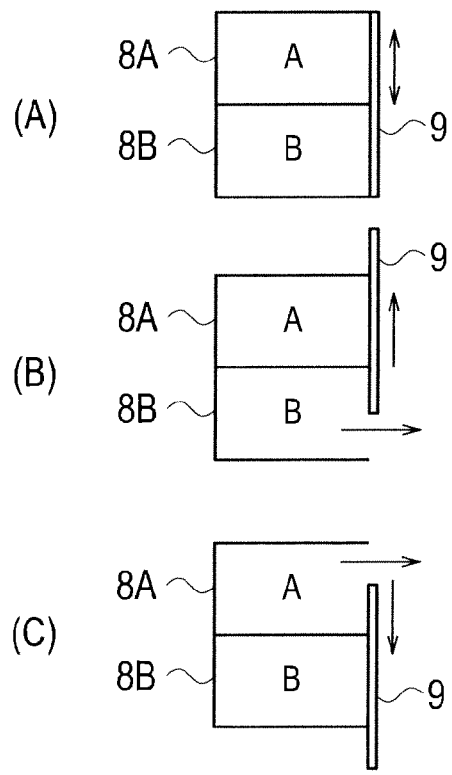
FIG. 9 shows an operation status of a fragrance valve attached to a fragrance holder in the first embodiment.

In processing in Step S6, the fragrance valve 9 is opened for the blowing time T1. As shown in FIG. 9, the fragrance holder 8 is provided with a first fragrance holder 8A holding the fragrance A and a second fragrance holder 8B holding the fragrance B which are arranged next to each other. The first fragrance holder 8A and the second fragrance holder 8B have a structure in which openings thereof are opened or closed when the shared sliding fragrance valve 9 slides to move to a position where one is opened and the other is closed or a position where both are closed. Part (A) of FIG. 9 shows a state where both the openings of the first fragrance holder 8A and the second fragrance holder 8B are closed. Part (B) of FIG. 9 shows a state where the opening of the first fragrance holder 8A is closed and the opening of the second fragrance holder 8B is opened. Part (C) of FIG. 9 shows a state where the opening of the first fragrance holder 8A is opened and the opening of the second fragrance holder 8B is closed. In the processing in Step S6, the fragrance valve 9 is in the state in Part (B) of FIG. 9 or in Part (C) of FIG. 9 and blows the fragrance A or B into the vehicle cabin 3.

In processing in next Step S7, the fragrance valve 9 is closed for the time T2. Specifically, the fragrance valve 9 is moved to the position shown in Part (A) of FIG. 9, and both the openings of the first fragrance holder 8A and the second fragrance holder 8B are closed for the time T2. Thereby, the blowing of the smell of the fragrance A or B is paused for the time T2 (pause time T2).

Next, in processing in Step S8, it is determined whether or not the number of the processing in Step S6 and the processing in Step S7 reaches a predetermined number of times (a predetermined number of times in one intermittent blowing cycle). If the number of the processings does not reach the predetermined number of times, the processing returns to the processing in Step S6. If the number of the processings reaches the predetermined number of times, the blowing of the fragrance A or B is stopped for the time T3 (stop time T3). Intermittently blowing the fragrance A or B in the intermittent blowing cycle and then stopping the blowing of the fragrance A or B for the predetermined time period (stop time T3) are repeated sequentially.

Incidentally, it is preferable that the blowing time T1 of blowing the fragrance A or B in the intermittent blowing cycle be, for example, approximately 10 seconds to 60 seconds, the pause time T2 in the intermittent blowing cycle be approximately 2 minutes to 5 minutes, and the stop time T3 after the end of the intermittent blowing cycle be 7 minutes or longer, which are provided for merely exemplary purposes.

Figure 10:
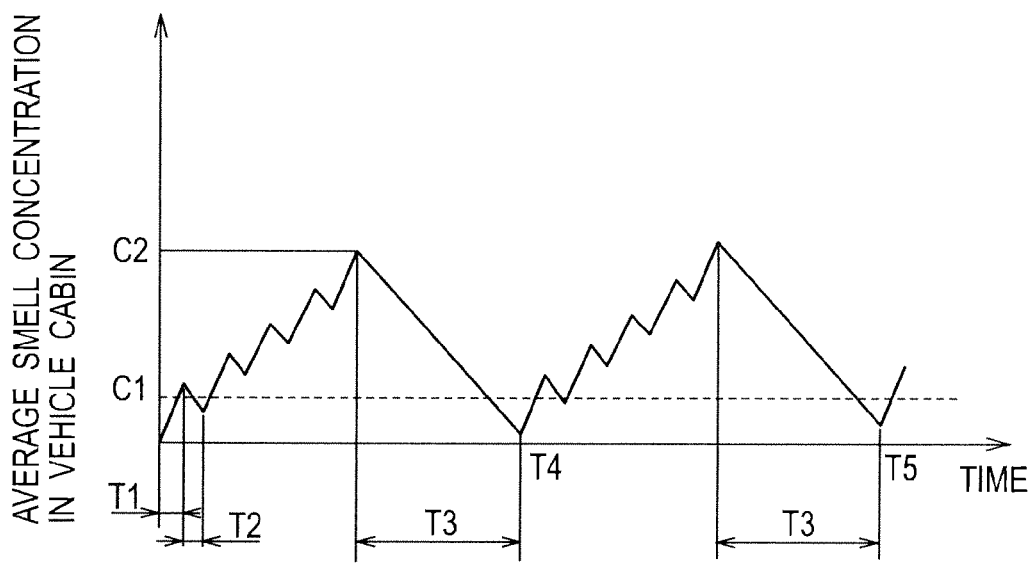
FIG. 10 shows changes in an average smell concentration in the vehicle cabin with respect to time in a case where fragrance control is performed using a fragrance or blown air having a standard perfume concentration in the first embodiment.

FIG. 10 is a graph showing changes in an average smell concentration in a vehicle cabin with respect to time in a case where fragrance control is performed using a fragrance or blown air having a standard perfume concentration. In FIG. 10, C1 denotes the recognition threshold concentration of the fragrance; C2, the maximum concentration at the time point of the end of the first intermittent blowing cycle; T1, the blowing time of the smell of the fragrance; T2, the pause time; T3, the stop time after the end of the intermittent blowing cycle; T4, an end time of the stop time T3; and T5, an end time of the stop time T3 in the second intermittent blowing cycle.

As described above, according the fragrance device for vehicle in First Embodiment, the fragrance blowing control means causes the smell of the fragrance to be intermittently blown in the predetermined cycle and repeats, the predetermined times, the cycle including the blowing of the fragrance smell and the pause. Then, the fragrance blowing control means stops the blowing of the fragrance smell for the predetermined time period. Since the stop time is provided, the average smell concentration in a vehicle which has risen with the elapse of time (or the fragrance concentration in the vehicle cabin) lowers during the stop time. This prevents the vehicle cabin from being filled with the fragrance smell and restrains the olfactory adaptation of the occupant. The occupant can be continuously provided for a long time with the changes in the smell sensory value caused by the intermittent emission. Consequently, the present device can reliably provide the occupant with a relaxing feeling or an easy feeling which requires a relatively long time to obtain.

In addition, according to the fragrance device for vehicle in First Embodiment, the stop time is made longer than the pause time in the intermittent blowing cycle, and thereby the average smell concentration in the vehicle cabin can be reliably lowered during the stop time.

Besides, according to the fragrance device for vehicle in First Embodiment, the recognition threshold concentration based on which when a smell is blown, the smell is recognized as being weak but enough for the occupant to know what the smell is of is set. Since the intensity of the smell is such a degree that the type thereof can be just known, the degree of smell pleasantness-unpleasantness is not easily influenced by the smell preferences of the occupant. Moreover, according to the present device, the smell sensory value does not fluctuate largely, and thus the occupant is less likely to be surprised. The occupant can be given a relaxation effect more effectively.

Further, according to the fragrance device for vehicle in First Embodiment, the type of the blown fragrance is changed between before and after the stop time, and thus the type of the smell is changed every intermittent blowing cycle. This can restrain the olfactory adaptation. Even fragrances having the same efficacies can continuously exert the effects thereof for a long time.

Still further, according to the fragrance device for vehicle in First Embodiment, when the ventilation mode of the air conditioner for vehicle is in the outside air intake mode in which outside air is introduced into the vehicle cabin, the stop time is made shorter than in the internal circulation mode in which outside air is prevented from entering the vehicle cabin. In the outside air intake mode, more outside air is introduced into the vehicle cabin than in the internal circulation mode. For this reason, even though the stop time is made shorter, the average smell concentration in the vehicle cabin can be lowered, and thus the olfactory adaptation of the occupant can be restrained.

In addition, according a fragrance blowing method in First Embodiment, blowing the smell of the fragrance intermittently in the predetermined cycle, repeating the cycle including the blowing of the fragrance smell and the pause predetermined times, and thereafter stopping the blowing of the fragrance smell for the predetermined time period are repeated sequentially. For this reason, the average smell concentration in a vehicle lowers during the stop time. This restrains the olfactory adaptation of the occupant, and the occupant can be continuously provided for a long time with the changes in the smell sensory value caused by the intermittent emission. Consequently, the present method can reliably provide the occupant with a relaxing feeling or an easy feeling which requires a relatively long time to obtain.

Besides, according to the fragrance blowing method in First Embodiment, the stop time is made longer than the pause time in the intermittent blowing cycle, and thereby the average smell concentration in the vehicle cabin can be reliably lowered during the stop time.

Second Embodiment

Figure 11:
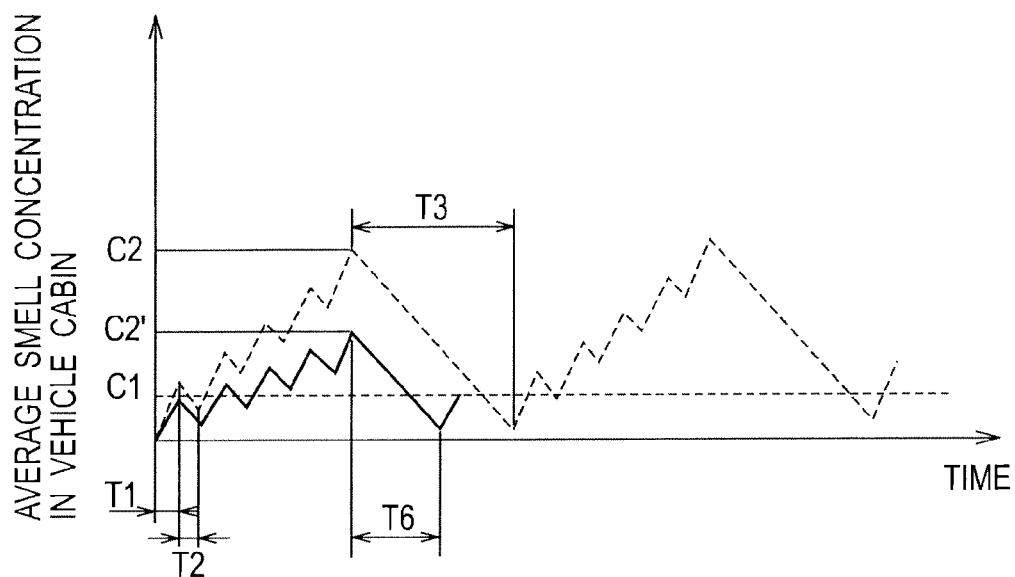
FIG. 11 shows changes in an average smell concentration in a vehicle cabin with respect to time in a second embodiment of the present invention.

FIG. 11 is a diagram showing changes in an average smell concentration in a vehicle cabin with respect to time in Second Embodiment. In Second Embodiment, the concentration of a smell to be blown is made lower than that in First Embodiment, and a stop time from the end of the intermittent blowing cycle to the start of the next intermittent blowing cycle is reduced to a time T6 shorter than the stop time T3 in First Embodiment, as shown in FIG. 11. The maximum concentration at the time point of the end of one cycle of the intermittent blowing cycle is C2'. In FIG. 11, a solid line shows a case of Second Embodiment, and a dashed line shows the case of First Embodiment.

Thereby, the average smell concentration in the vehicle cabin 3 can be restrained to be lower than in First Embodiment, and the smell can be blown with a shorter interval between the intermittent blowing cycles. Thus, reduction of the relaxation effect due to stopping of the blowing can be restrained.

Third Embodiment

Figure 12:
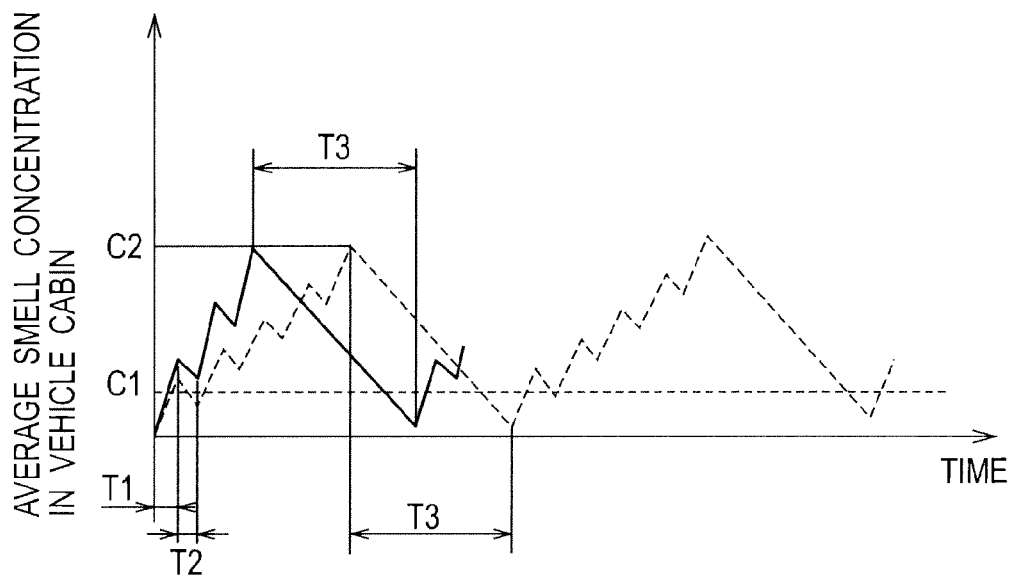
FIG. 12 shows changes in an average smell concentration in a vehicle cabin with respect to time in a third embodiment of the present invention.

FIG. 12 is a diagram showing changes in an average smell concentration in a vehicle cabin with respect to time in Third Embodiment. In Third Embodiment, the concentration of a smell to be blown is made higher than in First Embodiment, and the number of blowing times per intermittent blowing cycle is reduced to the number of times smaller than the number of times in First Embodiment. In FIG. 12, a solid line shows a case of Third Embodiment, and a dashed line shows the case of First Embodiment.

Reduction of the number of blowing times per intermittent blowing cycle as in Third Embodiment leads to reduction of an amount of a smell of the fragrance 7 introduced into the vehicle cabin 3, which can restrain the rising of the average smell concentration in the vehicle cabin at the time point of the end of one intermittent blowing cycle.

Note that, by reducing the blowing time T1 as well, it is likewise possible to restrain the rising of the average smell concentration in the vehicle cabin at the time point of the end of one intermittent blowing cycle.

Fourth Embodiment

Figure 13:
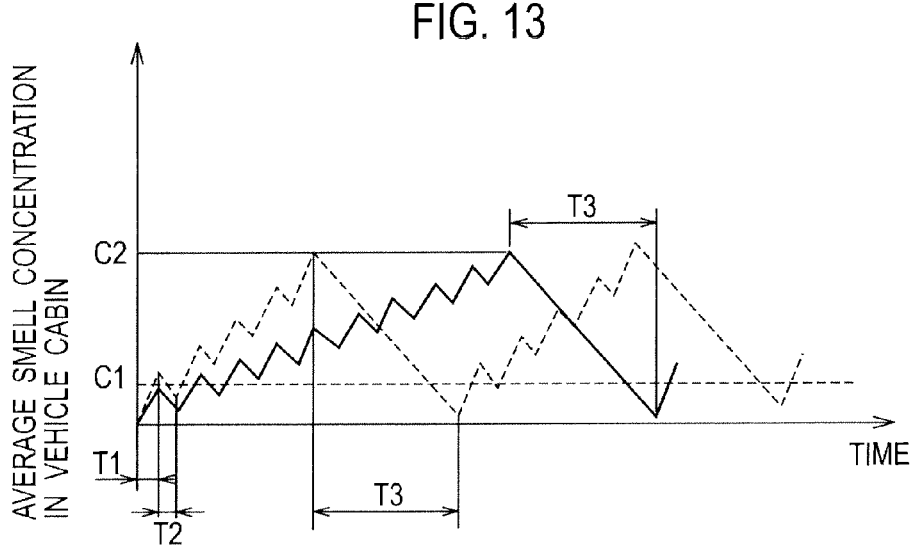
FIG. 13 shows changes in an average smell concentration in a vehicle cabin with respect to time in a fourth embodiment of the present invention.

FIG. 13 is a diagram showing changes in an average smell concentration in a vehicle cabin with respect to time in Fourth Embodiment. In Fourth Embodiment, the concentration of a smell to be blown is made lower than in First Embodiment, and the number of blowing times per intermittent blowing cycle is increased to the number of times larger than the number of times in First Embodiment. In FIG. 13, a solid line shows a case of Fourth Embodiment, and a dashed line shows the case of First Embodiment.

Making the concentration of the smell to be blown lower than that in First Embodiment and increasing the number of times of blowing per intermittent blowing cycle as in Fourth Embodiment leads to reduction of the number of cycles each including the intermittent blowing cycle and the stop time in comparison with First Embodiment. Thereby, the average smell concentration in the vehicle cabin can be restrained to be low.

Fifth Embodiment

Figure 14:
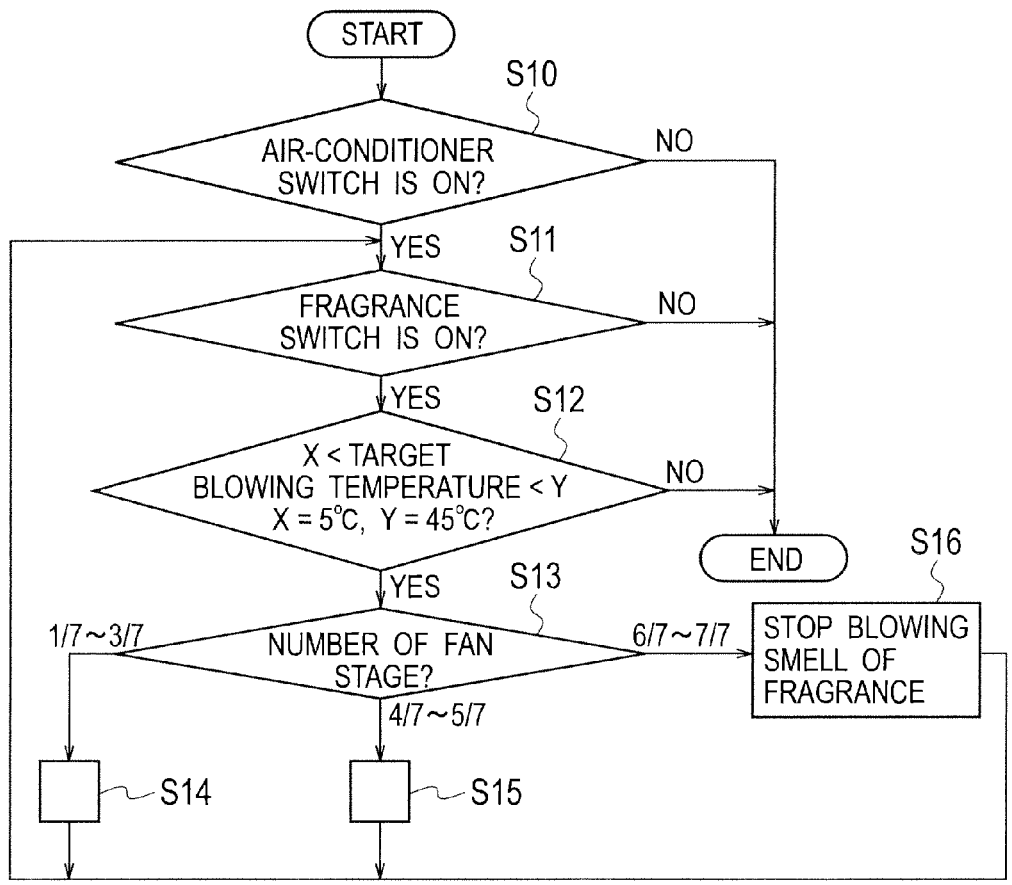
FIG. 14 is a flowchart for fragrance blowing control in a fifth embodiment of the present invention.
Figure 15:
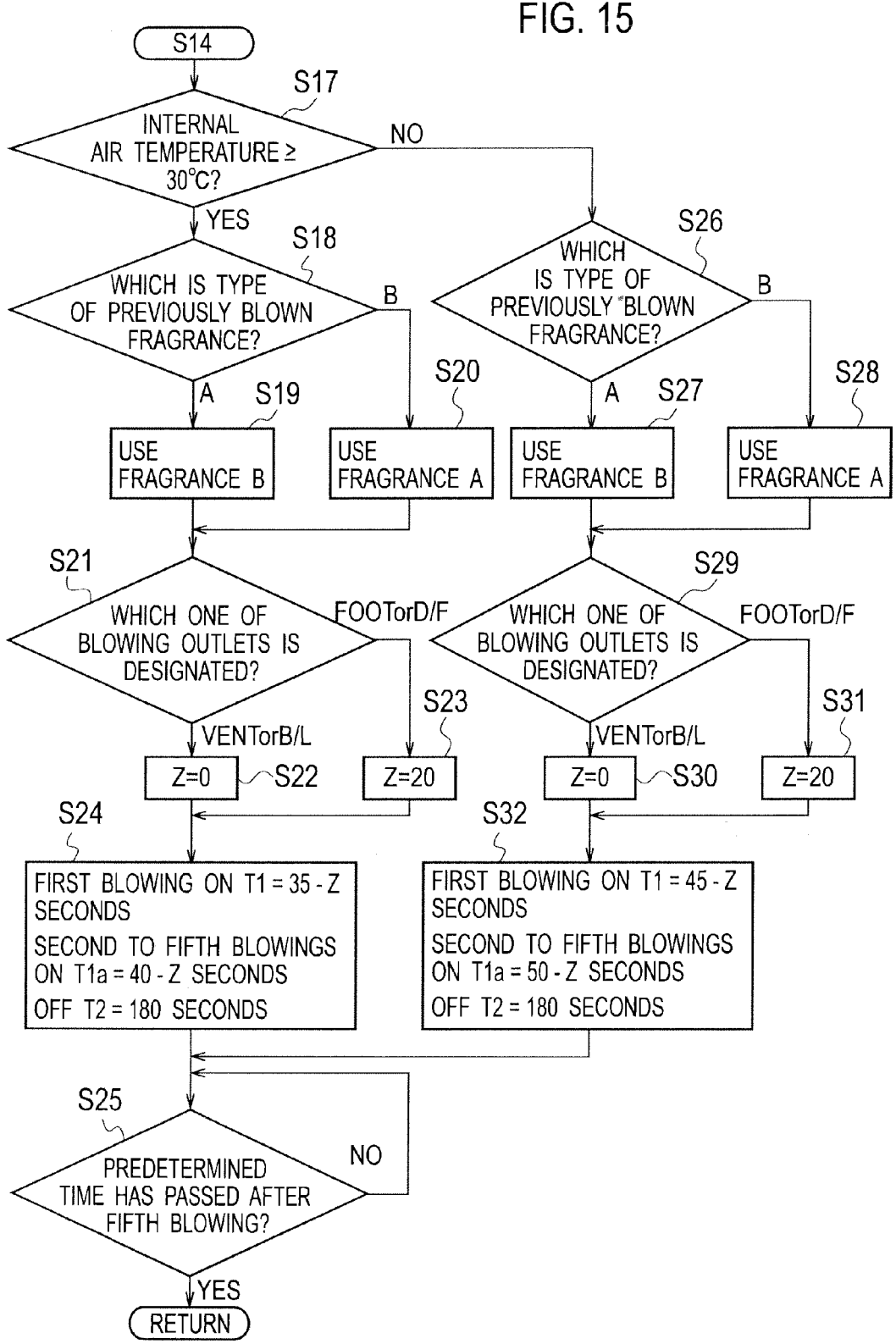
FIG. 15 is a flowchart showing processing in Step S14 in the control flowchart in FIG. 14.

FIG. 14 is a flowchart for fragrance blowing control in a fifth embodiment. FIG. 15 is a flowchart showing processing in Step S14 in the control flowchart in FIG. 14. FIG. 16 is a flowchart showing processing in Step S15 in the control flowchart in FIG. 14. FIG. 17 is a diagram for explaining intermittent blowing of fragrance in the fifth embodiment.

A description is given of fragrance blowing control in Fifth Embodiment. Firstly, in processing in Step S10, whether or not the air-conditioner switch 12 is ON is detected. If the air-conditioner switch 12 is OFF, the control flow ends. If the air-conditioner switch 12 is ON, whether or not the fragrance switch 13 is ON is detected in processing in next Step S11. If the fragrance switch 13 is OFF, the control flow ends. If the fragrance switch 13 is ON, it is determined in processing in next Step S12 whether or not a temperature of air blown from the air conditioner is a desired temperature value (a target blowing temperature). In this embodiment, X (5° C.)<the target blowing temperature<Y (45° C.) is set.

If the target blowing temperature is equal to or lower than X (5° C.) or equal to or higher than Y (45° C.) in processing in Step S12, the smell of the fragrance 7 is not blown. This is because, at warm-up or cool-down by the air conditioner, the occupant 11 prefers comfort due to the temperature in the vehicle cabin 3 over pleasantness due to the smell of the fragrance 7. Blowing the smell of the fragrance 7 after the end of the warm-up or the cool-down by the air conditioner can reliably make the occupant 11 find the effect of the smell of the fragrance 7 and prevent the life of the fragrance 7 from being decreased due to emission of the smell in an undesirable time period.

If the air temperature blown from the air conditioner is at the target blowing temperature in processing in Step S12, the processing proceeds to processing in next Step S13. In the processing in Step S13, an air flow rate (the number of fan stage) of the air-conditioner fan 2 is determined. For example, suppose a case where the air flow rate of the air-conditioner fan 2 is divided into 7 stages from 1 to 7 (a larger value has a larger air flow rate). If the fan stage is between 1 and 3, processing in Step S14 is executed. If the fan stage is 4 or 5, processing in Step S15 is executed. If the fan stage is 6 or 7, processing in Step S16 is executed.

Hereinbelow, a description is given of the processing in Step S14 in the case where the fan stage is between 1 and 3 (a case where the air flow rate of the air-conditioner fan 2 is relatively small) with reference to the flowchart in FIG. 15. In processing in first Step S17, it is determined whether or not the internal air temperature detected by an internal air temperature sensor provided in the vehicle cabin 3 is equal to or higher than a predetermined temperature. The predetermined temperature used for the determination in the processing in Step S14 is 30° C., for example. If the internal air temperature is determined to be equal to or higher than 30° C. in the processing in Step S17, processing proceeds to processing in Step S18. In the processing in Step S18, it is determined whether the type of the fragrance 7 previously blown is the fragrance A or the fragrance B which is of a different type from the fragrance A. If the fragrance 7 previously used is the fragrance A, the fragrance B is used in processing in Step S19. On the other hand, if the fragrance 7 previously used is the fragrance B, the fragrance A is used in processing in Step S20.

In processing in next Step S21, it is determined which one of blowing outlets of the smell to the vehicle cabin 3 is designated (blowing outlet determination). If the blowing outlet is VENT or BI-LEVEL (B/L), the smell of the fragrance 7 is included in the air-conditioning air without any additional operation and is blown from VENT or BI-LEVEL into the vehicle cabin 3. In contrast, if the blowing outlet is FOOT or DEF/FOOT (D/F), the smell is blown while a blowing time is reduced by a predetermined time Z.

For example, if it is determined that the blowing outlet is VENT or BI-LEVEL in the processing in Step S21, the predetermined time Z is set at zero (Z=0) in processing in next Step S22. On the other hand, if it is determined that the blowing outlet is FOOT or DEF/FOOT in the processing in Step S21, the predetermined time Z is set at 20 (Z=20) in processing in next Step S23. In processing in next Step S24, a difference is made between the time T1 of the first blowing of the smell of the fragrance 7 and a time T1a of the second blowing and after (the second to the fifth blowings). This is because the tank of the fragrance 7 is filled with the smell and in a dense state in the first blowing, and thus the smell needs to be restrained by making the blowing time T1 shorter in the first blowing.

When the blowing outlet is VENT or BI-LEVEL, the time T1 of the first blowing is 35 seconds, and the time T1a of the second blowing and after is 40 seconds. In contrast, when the blowing outlet is FOOT or DEF/FOOT, the time T1 of the first blowing is 15 seconds, and the time T1a of the second blowing and after is 20 seconds, as the result of reduction of the predetermined time Z (20 seconds). When the blowing outlet is FOOT or DEF/FOOT, that is, when the blowing is switched to the blowing to the feet, the air flow distributed to the feet is increased. Reduction of the air flow to the face of the occupant 11 increases the smell concentration around the feet. Hence, in order to average the smell concentration distribution in the vehicle cabin 3, the blowing time is made shorter than that in the blowing to VENT or BI-LEVEL.

In processing in Step S25, it is determined whether or not a predetermined time has passed since the fifth blowing in intermittently blowing the smell of the fragrance A. In this embodiment, the predetermined time is a stop time T3 during which the smell of the fragrance is stopped, and an actual stop time T3 is set to be 2500 seconds. If the predetermined time has passed in the processing in Step S25, the processing proceeds to the processing in Step S11. If the predetermined time has not passed in the processing in Step S25, the processing in Step S25 is repeated.

If it is determined that the internal air temperature is lower than 30° C. in the processing in Step S17 described above, the processing proceeds to processing in next Step S26 to determine whether the type of the fragrance 7 previously blown is the fragrance A or the fragrance B. If the fragrance 7 previously used is the fragrance A, the fragrance B of a different type from this is used in processing in Step S27. On the other hand, if the fragrance 7 previously used is the fragrance B, the fragrance A of a different type from this is used in processing in Step S28.

In processing in next Step S29, it is determined which one of the blowing outlets of the smell to the vehicle cabin 3 is designated (blowing outlet determination). If the blowing outlet is VENT or BI-LEVEL (B/L), the smell of the fragrance 7 is included in the air-conditioning air without any additional operation and is blown from VENT or BI-LEVEL into the vehicle cabin 3. In contrast, if the blowing outlet is FOOT or DEF/FOOT (D/F), the smell is blown while the blowing time is reduced by a predetermined time Z.

For example, if it is determined that the blowing outlet is VENT or BI-LEVEL in the processing in Step S29, the predetermined time Z is set at zero (Z=0) in processing in next Step S30. On the other hand, if it is determined that the blowing outlet is FOOT or DEF/FOOT in the processing in Step S29, the predetermined time Z is set at 20 (Z=20) in processing in next Step S31. In processing in next Step S32, a difference is made between the time T1 of the first blowing of the smell of the fragrance 7 and the time T1a of the second blowing and after (the second to the fifth blowings). The reason why the difference is provided is the same as the reason described for the processing in previous Step S24.

When the blowing outlet is VENT or BI-LEVEL, the time T1 of the first blowing is 45 seconds, and the time T1a of the second blowing and after is 50 seconds. In contrast, when the blowing outlet is FOOT or DEF/FOOT, the time T1 of the first blowing is 25 seconds, and the time T1a of the second blowing and after is 30 seconds, as the result of reduction of the predetermined time Z (20 seconds). The reason why the difference is provided is the same as the reason described for the processing in previous Step S24.

Next, a description is given of the processing in Step S15 in the case where the fan stage is 4 or 5 (a case where the air flow rate of the air-conditioner fan 2 is relatively large) with reference to the flowchart in FIG. 16. In processing in first Step S33, it is determined whether or not the internal air temperature detected by an internal air temperature sensor provided in the vehicle cabin 3 is equal to or higher than a predetermined temperature. If the internal air temperature is determined to be equal to or higher than 30° C., processing proceeds to processing in Step S34. In the processing in Step S34, it is determined whether the type of the fragrance 7 previously blown is the fragrance A or the fragrance B. If the fragrance 7 previously used is the fragrance A, the fragrance B of a different type from this is used in processing in Step S35. On the other hand, if the fragrance 7 previously used is the fragrance B, the fragrance A of a different type from this is used in processing in Step S36.

In processing in next Step S37, it is determined which one of blowing outlets of the smell to the vehicle cabin 3 is designated (blowing outlet determination). If the blowing outlet is VENT or BI-LEVEL (B/L), the smell of the fragrance 7 is included in the air-conditioning air without any additional operation and is blown from VENT or BI-LEVEL into the vehicle cabin 3. In contrast, if the blowing outlet is FOOT or DEF/FOOT (D/F), the smell is blown while a blowing time is reduced by a predetermined time Z.

For example, if it is determined that the blowing outlet is VENT or BI-LEVEL in the processing in Step S37, the predetermined time Z is set at zero (Z=0) in processing in next Step S38. On the other hand, if it is determined that the blowing outlet is FOOT or DEF/FOOT in the processing in Step S37, the predetermined time Z is set at 30 (Z=30) in processing in next Step S39. In this embodiment, the predetermined time is set longer than in the case of the fan stage between 1 and 3. In processing in next Step S40, the time T1 of the first blowing of the smell of the fragrance 7 is the same as a time T1a of the second blowing and after (the second to the fifth blowings).

When the blowing outlet is VENT or BI-LEVEL, the time T1 of the first blowing is 30 seconds, and the time T1a of the second blowing and after is also 30 seconds. In contrast, when the blowing outlet is FOOT or DEF/FOOT, the time T1 of the first blowing is 0 seconds, and the time T1a of the second blowing and after is 0 seconds. When the fan stage is 4 or 5, more air flow is distributed to the feet than in the case of the fan stage between 1 and 3, and thus the smell of the fragrance 7 is not blown.

In processing in Step S41, it is determined whether or not a predetermined time has passed since the fifth blowing in intermittently blowing the smell of the fragrance A. In this embodiment, the predetermined time is a stop time T3 during which the smell of the fragrance is stopped, and an actual stop time T3 is set to be 2500 seconds. If the predetermined time has passed in the processing in Step S41, the processing proceeds to the processing in Step S11. If the predetermined time has not passed in the processing in Step S41, the processing in Step S41 is repeated.

If it is determined that the internal air temperature is lower than 30° C. in the processing in Step S33 described above, the processing proceeds to processing in next Step S42 to determine whether the type of the fragrance 7 previously blown is the fragrance A or the fragrance B. If the fragrance 7 previously used is the fragrance A, the fragrance B of a different type from this is used in processing in Step S43. On the other hand, if the fragrance 7 previously used is the fragrance B, the fragrance A of a different type from this is used in processing in Step S44.

In processing in next Step S45, it is determined which one of the blowing outlets of the smell to the vehicle cabin 3 is designated (blowing outlet determination). If the blowing outlet is VENT or BI-LEVEL (B/L), the smell of the fragrance 7 is included in the air-conditioning air without any additional operation and is blown from VENT or BI-LEVEL into the vehicle cabin 3. In contrast, if the blowing outlet is FOOT or DEF/FOOT (D/F), the smell is blown while the blowing time is reduced by a predetermined time Z.

For example, if it is determined that the blowing outlet is VENT or BI-LEVEL in the processing in Step S45, the predetermined time Z is set at zero (Z=0) in processing in next Step S46. On the other hand, if it is determined that the blowing outlet is FOOT or DEF/FOOT in the processing in Step S45, the predetermined time Z is set at 30 (Z=30) in processing in next Step S47. In processing in next Step S48, no difference is made between the time T1 of the first blowing of the smell of the fragrance 7 and the time T1a of the second blowing and after (the second to the fifth blowings).

When the blowing outlet is VENT or BI-LEVEL, the time T1 of the first blowing is 30 seconds, and the time T1a of the second blowing and after is also 30 seconds. In contrast, when the blowing outlet is FOOT or DEF/FOOT, the blowing of the smell of the fragrance 7 is not performed.

In the case of the fan stage of 6 or 7 (the air flow rate of the air-conditioner fan 2 is the largest), the blowing of the smell of the fragrance 7 is stopped in the processing in Step S16. The smell of the fragrance 7 is carried on the air-conditioning air to disperse in the vehicle cabin 3. Thus, a too large blowing air flow leads to a too large emission amount of the smell of the fragrance 7, which makes the occupant 11 feel unpleasant instead. For this reason, when the air flow rate of the air blown to the fragrance 7 is equal to or higher than a predetermined value, the smell of the fragrance 7 is stopped from being blown into the vehicle cabin 3 to save the life of the fragrance 7.

According to the fragrance blowing method in Fifth Embodiment, when the temperature of the air blown to the fragrance 7 is at the desired temperature value, the smell of the fragrance 7 is blown into the vehicle cabin 3. Thus, a comfortable relaxation effect due to the smell of the fragrance 7 can be obtained. At the warm-up or the cool-down by the air conditioner, the occupant 11 prefers comfort due to the temperature in the vehicle cabin 3 over pleasantness due to the fragrance. For this reason, after the warm-up or the cool-down by the air conditioner is completed, the smell of the fragrance 7 is blown, which can reliably make the occupant 11 find the effect of the smell of the fragrance 7 and prevent the life of the fragrance 7 from being decreased due to emission of the smell in an undesirable time period.

In addition, according to the fragrance blowing method in Fifth Embodiment, when the air flow rate of the air blown to the fragrance 7 is equal to or higher than the predetermined value, the smell of the fragrance 7 is stopped from being blown into the vehicle cabin 3. Thus, the occupant 11 can enjoy the smell of the fragrance 7 in the optimum state in which the relaxed feeling is obtainable. The smell of the fragrance 7 is carried on the air-conditioning air to disperse in the vehicle cabin 3. Thus, a too large blowing air flow leads to a too large emission amount of the smell of the fragrance 7, which makes the occupant 11 feel unpleasant instead. For this reason, when the air flow rate of the air blown to the fragrance 7 is equal to or higher than the predetermined value, the smell of the fragrance 7 is stopped from being blown into the vehicle cabin 3 to save the life of the fragrance 7.

Besides, according to the fragrance blowing method in Fifth Embodiment, the time of blowing the smell of the fragrance 7 is changed according to the internal air temperature in the vehicle cabin 3, and thus the occupant 11 can always enjoy the pleasant smell of the fragrance 7. Specifically, how the occupant 11 feels the smell of the fragrance 7 depends on the internal air temperature of the vehicle cabin 3. However, even if the internal air temperature changes, the influence of the smell of the fragrance 7 on the occupant 11 can be made the same. This is because the time of blowing the smell is changed according to the internal air temperature of the vehicle cabin 3.

Further, according to the fragrance blowing method in Fifth Embodiment, the time of blowing the smell of the fragrance 7 is changed according to the air flow rate of the air blown to the fragrance 7, and thus the occupant 11 can be provided with the pleasant smell of the fragrance 7 regardless of the magnitude of the air flow rate. Specifically, the smell of the fragrance 7 is carried on the air-conditioning air to disperse in the vehicle cabin 3. When the blowing outlet mode is changed, the air flow rate from the blowing outlet is changed, and thus the emission amount of the smell of the fragrance 7 is also changed. According to Fifth Embodiment, however, the time of blowing the smell of the fragrance 7 is changed according to the air flow rate of the air blown to the fragrance 7, and thus the influence of the smell of the fragrance 7 on the occupant 11 can be made the same regardless of the magnitude of the air flow rate.

Still further, according to the fragrance blowing method in Fifth Embodiment, in the predetermined cycle of intermittently blowing the smell of the fragrance 7, the first blowing time is set to have a different duration from the blowing time thereafter. Thereby, the relaxation effect given to the occupant 11 can be optimized. Specifically, the optimum blowing time can be set according to the olfactory adaptation and how the occupant 11 feels depending on the type of the fragrance 7. Thus, the influence of the smell of the fragrance 7 on the occupant 11 can be made the same, and the life of the fragrance 7 can be saved.

Sixth Embodiment

In Sixth Embodiment, the blowing time of the smell of the fragrance 7 may be changed according to the desired temperature of air blown from the air conditioner (the target blowing temperature). How the occupant 11 feels the smell of the fragrance 7 depends on the temperature of the air-conditioning air containing the smell of the fragrance 7. However, by changing the blowing time of the fragrance 7 according to the change of the blown air temperature, the influence of the smell of the fragrance 7 on the occupant 11 can be made the same.

The embodiments described above are merely illustrations described for easy understanding of the present invention. The present invention is not limited to the embodiments, and various modifications can be made within the technical scope of the present invention.

The present application claims priority from Japanese patent application JP 2009-156629 filed on Jul. 1, 2009, the content of which is herein incorporated by reference in its entirety.

INDUSTRIAL APPLICABILITY

The present invention can be utilized for a fragrance device for vehicle which intermittently blows a smell of a fragrance into a vehicle cabin.

REFERENCE SIGNS LIST 1 air conditioner for vehicle
2 air-conditioner fan (blowing means)
3 vehicle cabin
4 air-conditioner blowing outlet
7 fragrance
8 fragrance holder
9 fragrance valve
10 fragrance fan (blowing means)
11 occupant
12 air-conditioner switch
13 fragrance switch
14 air-conditioner temperature adjustment switch
15 air-conditioner controller
16 temperature sensor
17 solar radiation sensor
18 air-conditioner compressor
19 fragrance controller (fragrance blowing control means)

The invention claimed is:

1. A fragrance device for a vehicle comprising:
a fragrance holder holding a fragrance;
a blowing device configured to blow air to the fragrance holder to blow a smell of the fragrance into a vehicle cabin, the blowing device comprising an air conditioner of the vehicle; and
a fragrance blowing controller installed in the vehicle and programmed to control the blowing device to sequentially repeat
a repeating, for a predetermined number of times, of a predetermined cycle of blowing the smell of the fragrance and pausing the blowing of the smell of the fragrance for a first predetermined time period, and then
a stop time in which the blowing of the smell of the fragrance is stopped for a second predetermined time period that is longer than the first predetermined time period,
wherein the fragrance blowing controller is programmed to make the stop time shorter in an outside air intake mode than in an internal circulation mode, the outside air intake mode being a ventilation mode of the air conditioner of the vehicle, configured to introduce outside air into the vehicle cabin, the internal circulation mode being a ventilation mode of the air conditioner of the vehicle, configured to not introduce outside air into the vehicle cabin,
wherein the fragrance blowing controller is programmed to change the first predetermined time period according to a temperature of the air blown to the fragrance from the air conditioner of the vehicle, and
wherein the fragrance blowing controller is programmed to control the blowing device to blow the smell of the fragrance into the vehicle cabin only when the temperature of the air blown to the fragrance from the air conditioner of the vehicle is between a first predetermined temperature and a second predetermined temperature.

2. The fragrance device for a vehicle according to claim 1,
wherein the fragrance blowing controller is programmed to make the stop time shorter and reduce a concentration of the smell to be blown.

3. The fragrance device for a vehicle according to claim 1,
wherein the fragrance blowing controller is programmed to set a recognition threshold concentration at which the occupant is capable of recognizing the smell as being weak, but can identify the smell when the smell is blown.

4. The fragrance device for a vehicle according to claim 1,
wherein the fragrance blowing controller is programmed to change the first predetermined time period according to an internal air temperature of the vehicle cabin.

5. The fragrance device for a vehicle according to claim 1,
wherein the fragrance blowing controller is programmed to change the first predetermined time period according to a target blowing temperature of air blown from the air conditioner of the vehicle.

6. The fragrance device for a vehicle according to claim 1,
wherein the first predetermined temperature is 5° C. and the second predetermined temperature is 45° C.

7. A fragrance device for a vehicle comprising:
a fragrance holder holding a fragrance;
a blowing means for blowing air to the fragrance holder to blow a smell of the fragrance into a vehicle cabin, the blowing means comprising an air conditioner of the vehicle; and
a fragrance blowing control means for controlling the blowing means, installed in the vehicle and programmed to sequentially repeat
a repeating, for a predetermined number of times, of a predetermined cycle of blowing the smell of the fragrance and pausing the blowing of the smell of the fragrance for a first predetermined time period, and then
a stop time in which the blowing of the smell of the fragrance is stopped for a second predetermined time period that is longer than the first predetermined time period,
wherein the fragrance blowing control means is programmed to make the stop time shorter in an outside air intake mode of a ventilation mode of the air conditioner of the vehicle than in an internal circulation mode, the outside air intake mode being configured to introduce outside air into the vehicle cabin, the internal circulation mode being configured to not introduce outside air into the vehicle cabin,
wherein the fragrance blowing control means is programmed to change the first predetermined time period according to a temperature of the air blown to the fragrance from the air conditioner of the vehicle, and
wherein the fragrance blowing control means is programmed to control the blowing means to blow the smell of the fragrance into the vehicle cabin only when the temperature of the air blown to the fragrance from the air conditioner of the vehicle is between a first predetermined temperature and a second predetermined temperature.

8. The fragrance device for a vehicle according to claim 7,
wherein the first predetermined temperature is 5° C. and the second predetermined temperature is 45° C.

* * * * *